(No Model.) 4 Sheets—Sheet 1.

W. F. BERNER.
APPARATUS FOR MANUFACTURING OR PRODUCING METALS FROM THEIR ORES.

No. 587,052. Patented July 27, 1897.

Witnesses:
John C. Lennie
A. M. Parkins.

Inventor:
W. F. Berner
by Jo. H. Kennedy
Attys

THE NORRIS PETERS CO., PHOTO-LITHO., WASHINGTON, D. C.

(No Model.)  4 Sheets—Sheet 2.

W. F. BERNER.
APPARATUS FOR MANUFACTURING OR PRODUCING METALS FROM THEIR ORES.

No. 587,052.  Patented July 27, 1897.

Witnesses:  Inventor;
W. F. Berner
by
Attys (No Model.) 4 Sheets—Sheet 3.

W. F. BERNER.
APPARATUS FOR MANUFACTURING OR PRODUCING METALS FROM THEIR ORES.

No. 587,052. Patented July 27, 1897.

Fig. 3.

Witnesses:

Inventor;
W. F. Berner
By Kennedy
Attys.

(No Model.)　　　　　　　　　　　　　　　　4 Sheets—Sheet 4.
W. F. BERNER.
APPARATUS FOR MANUFACTURING OR PRODUCING METALS FROM THEIR ORES.

No. 587,052.　　　　　　　　　　　　Patented July 27, 1897.

Witnesses
B. S. Ober
B. W. Sommers

Inventor
Wladimir F. Berner
By [signature]
Attorney

UNITED STATES PATENT OFFICE.

WLADIMIR FEDOROWITSCH BERNER, OF ST. PETERSBURG, RUSSIA.

APPARATUS FOR MANUFACTURING OR PRODUCING METALS FROM THEIR ORES.

SPECIFICATION forming part of Letters Patent No. 587,052, dated July 27, 1897.

Application filed February 15, 1894. Serial No. 500,307. (No model.) Patented in Luxemburg October 14, 1893, No. 1,910.

*To all whom it may concern:*

Be it known that I, WLADIMIR FEDOROWITSCH BERNER, state counselor and mining engineer, a subject of the Emperor of Russia, residing at St. Petersburg, in the Province of St. Petersburg, in the Empire of Russia, have invented certain new and useful Improvements in the Manufacture or Production of Metals from Their Ores and in Plant or Apparatus Therefor, (for which I have obtained Letters Patent in Luxemburg, No. 1,910, dated October 14, 1893;) and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention relates to improvements in the method of obtaining metals direct from the ores with the simultaneous and continuous production of various products of the smelting operations, all of good quality and with great economy of fuel, (solid and gaseous,) and to improvements in plant or apparatus for putting this process into execution, said plant or apparatus comprising a regenerative blast-furnace worked with solid fuel and with injected gases of a particular nature, refining-chambers adapted to be placed in direct connection with the hearths of the blast-furnace, a gas-generator for the production of the gaseous mixture necessary for carrying out the said process, and a special arrangement of apparatus for the production of the air-blast.

For the purpose of smelting down the ores the furnace, which comprises two precisely similar halves, forming separate furnaces, is either worked one half with blast, air being blown into it at various heights in order to effect continuous reduction, while the other half of the furnace takes in by suction the gas circulating in the first half of the furnace, together with heated air from regenerators, and gaseous mixture produced in a gas-generator in order to create a high temperature suitable for decarbonizing, or both halves of the furnace are worked with blast for the purpose of simultaneously smelting, or one-half alone is put into operation. In either case the annexed refining-chambers may be worked either in connection with the furnace or independently thereof.

The gas and air conduits are so arranged that the furnace can be adapted to the kind of smelting product to be obtained, so that the most thorough decomposition and consumption of the products of combustion, as well as the removal of the carbonic acid, (which is injurious to the process for reasons hereinafter set forth,) the increase of the strength of the reaction by the heating of the shaft from the exterior, and the drawing of the air into the furnace and the generator in an already heated condition is effected; and, moreover, the running of the smelted metal out of the smelting-chamber direct into the refining-chamber in a distinct and independent manner from the tap-hole of the smelting-chamber is possible. The reduction and oxidation process can consequently be performed in the two halves of the furnace either alternately or simultaneously, and it may be accelerated by external heating with a diminution of the consumption of fuel in the furnaces and an increased production obtained even with plant of small dimensions.

In the accompanying drawings an arrangement of plant or apparatus is represented which is particularly suitable for obtaining iron direct from its ores in the form of pig-iron, steel, or wrought-iron.

Figure 1:
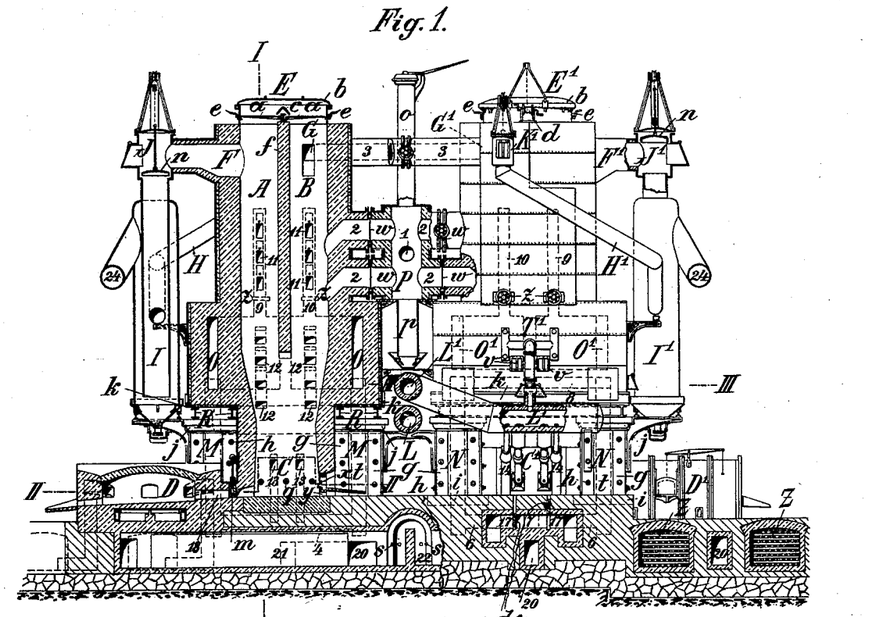
Figure 1 represents the regenerative blast-furnace with the annexed refining-chambers half in elevation and half in vertical section.

As is seen in Fig. 1, the regenerative blast-furnace consists of two exactly similar halves, each of which contains two shafts A B or A' B', which are separated by a partition $f$, but unite below in a common hearth C or C', that is adapted to be placed in connection with the respective refining-chambers D D', each pair of shafts being provided at the top with a charging arrangement E or E'. The partitions, which for the purpose of greater firmness are strengthened by several arches $a^4$, serve to diminish the breadth of the charge, so that the latter can be better permeated on the one hand by gases generated by the combustion of solid fuel in the furnace and on the other hand by injected gases and also by the air-blast.

The construction of the furnace in two equal halves renders it possible to reduce the height of the same relatively to existing blast-furnaces, and thereby to obviate the disadvantages of high furnaces.

Figure 7:
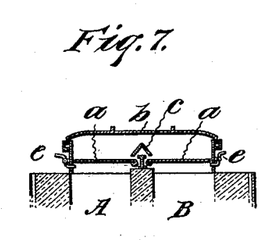
Figs. 7 and 8 are sections taken at right angles to each other, and Fig. 9 an end elevation of the charging appliance at the upper end of the furnace-stacks drawn to an enlarged scale.
Figure 8:
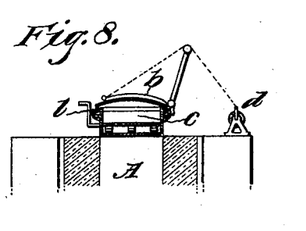
Figure 9:
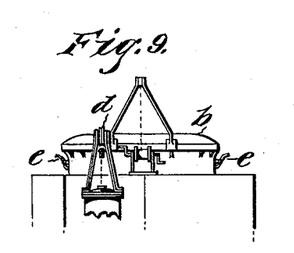

The charging arrangement, which serves simultaneously for closing the furnace-mouth, consists of an iron box resting partly on the partition and partly on the walls of the furnace and closed at the bottom by lids $a$ and at the top by a hinged cover $b$. In order to prevent the hinges of the lids and their bearings from becoming dirty during charging, they are covered with a roof-like cover $c$. The lids rest on bolts or catches $e$ and are free to turn down or open upon the said bolts or catches being drawn out, while they are closed by means of a lever or crank $l$. A winch $d$ serves for opening and closing the cover $b$. During charging the cover $b$ is open and the lids shut, so that the circulation of the gases in the furnace is not interfered with and their escape is prevented. After the cover $b$ has been closed the bolts or catches are drawn out, so that the charge lying on the lids falls into the furnace in consequence of the dropping of the latter.

Each of the shafts A and A', situate on the outer sides of the furnace, is provided with a gas-outlet F or F', and each of the inner shafts B and B' is provided with two small gas-outlets G or G'.

The gases escaping from the two shafts of each half of the furnace (hereinafter termed "gaseous products") pass through distributing apparatus K K' and pipes H H', which discharge into two gas-purifiers I I' through the inner tubes thereof, whence they can be led off, as required, by pipes 24 into steam-boilers, gas-generators, regenerators, roasting-furnaces, and other auxiliary apparatus, or by pipes 25 into burners Q.

For the purpose of regulating the flow each half of the furnace is provided with a distributing apparatus J or J', which consists of a cylindrical box, in which a cover or valve $n$ can be raised or lowered by a suitable lifting apparatus, and thereby the communication between the purifiers I I' and the gas-outlets F F' can be established or interrupted.

The two halves of the furnace are connected together by a regulator P and by the conduit-pipes 3. The regulator, which serves also as a holder for gas coming from the generator (hereinafter termed "generator-gas") through the pipe 1, is connected with the inner shafts B and B' by tubes 2, that are provided with shut-off dampers $w$, which regulate the flow of gas from one of the halves of the furnace to the other. This regulator, the pipes 2, and the furnace-shafts are constructed of refractory material and inclosed in an iron casing. The regulator is provided at the top with a pipe $o$, furnished with a safety-valve, and at the bottom with a pipe $p$, open at its lower end, which dips into a vessel that contains water and seals the lower open end of said pipe $p$ for the purpose of cooling and retaining coal and ore dust.

The entire furnace rests on hollow pillars M and N, which serve as gas-conduits and air-conduits, respectively. Each pillar consists of four cast-iron columns $g$, which are united by bolts $h$ and nuts, and of a tube 15 or 16, of refractory material, the corners of which are embedded in the columns. The tubes are covered externally with brickwork $t$ from top to bottom, and the spaces between the latter and the tubes are filled up with sand in order to prevent the gases passing through the joints of the tubes and the consequent loss of heat. The columns of each pillar have a common support $i$ and top piece $j$. On the latter rest the beams or girders R, which are covered with cast-iron plates $k$, which carry the shafts. At the bottom the pillars M communicate with gas-regenerators by means of conduits 4 and 5 and the pillars N with air-regenerators by means of conduits 6 and 7. At the top the former are connected with gas-jackets O O', which are arranged around the shafts, and the latter with air-conduits 8, which are arranged beneath the corresponding gas-jackets.

For the purpose of enabling the gases to enter and leave conduits 9 and 10 lead upward from the gas-jackets and are capable of being shut off by dampers $z$, of refractory material. These conduits and the gas-jackets communicate with the furnace-shafts through passages 11 12, respectively. Into the hearth also gas and air supply conduits 13 and 14 open, so that the gases from the conduits 4 and 5 and the air from the conduits 6 and 7 can also be introduced at the upper part of the smelting-zone. The conduits 4 and 6 serve, moreover, for connecting together the gas-conduit pillars M and the air-conduit pillars N, respectively, of each half of the furnace.

The heating of the regenerators is effected by means of the gaseous products, which are ignited by a burner Q, situate beneath each pair of regenerators. Each burner, which is connected with the regenerators by conduits 17, consists, preferably, of a wide horizontal tube open toward the fire-space or of a shallow gas-chamber into which the gaseous products flow laterally, and in the outer bottom plate of the chamber are inserted air-supply pipes $b^4$, which pass through this chamber longitudinally, the inlet-openings of which can be regulated by means of a suitable damper. (Not shown.)

Figure 2:
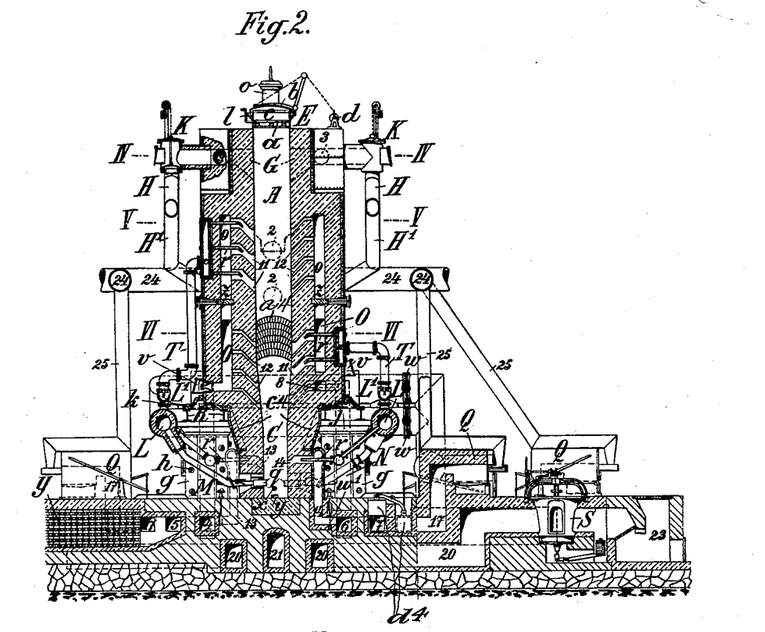
Fig. 2 is a vertical cross-section on the line I I of Fig. 1.

The upper part of each of the hearths C and C' is situated within a cast-iron envelop or casing, which is strengthened inside by ribs $c^4$, (shown in dotted lines in Fig. 2,) and the upper rim or flange of which lies on the beams R, that support the shaft.

Each hearth is connected with one of the refining-chambers D D' by means of a slightly-inclined conduit 18, which can be closed by a slide $m$. These refining-chambers are constructed in the manner of Siemens-Martin furnaces, the charging of them being directly effected by the discharge of the fluid metal from the hearth and the running off of the finished cast taking place at the narrow side or end of the refining-chamber. Each hearth is, moreover, provided with a tap-hole $y$ for running off the cast-iron and above the latter with a slag-hole $x$.

Figure 6:
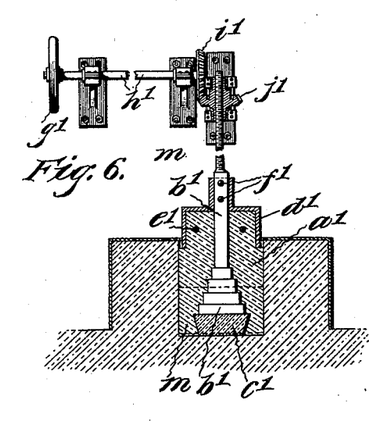
Fig. 6 is a separate view of the shutting-off apparatus between blast-furnace and refining-chamber.

Each slide $m$, Fig. 6, is made of refractory material $a'$, in which is inserted a square iron rod $b'$, which is provided with projecting step-like shoulders $l'$ and is held in place by a wedge $c'$, of fire-clay. This slide is at the top inclosed in an iron frame $d'$, which is attached to the refractory material $a'$ by bolts $e'$ and to the rod $b'$ by bolts $f'$. The upper end of the rod $b'$ is screw-threaded, and on it is arranged a bevel-wheel $j'$, correspondingly screw-threaded, which is prevented from moving longitudinally and which engages with a bevel-wheel $i'$, located on the shaft $h'$, that is capable of rotation by means of the hand-wheel $g'$ for the purpose of raising and lowering the slide $m$. By means of this arrangement the communication between the hearth and the refining-chamber is opened or closed.

Figure 3:
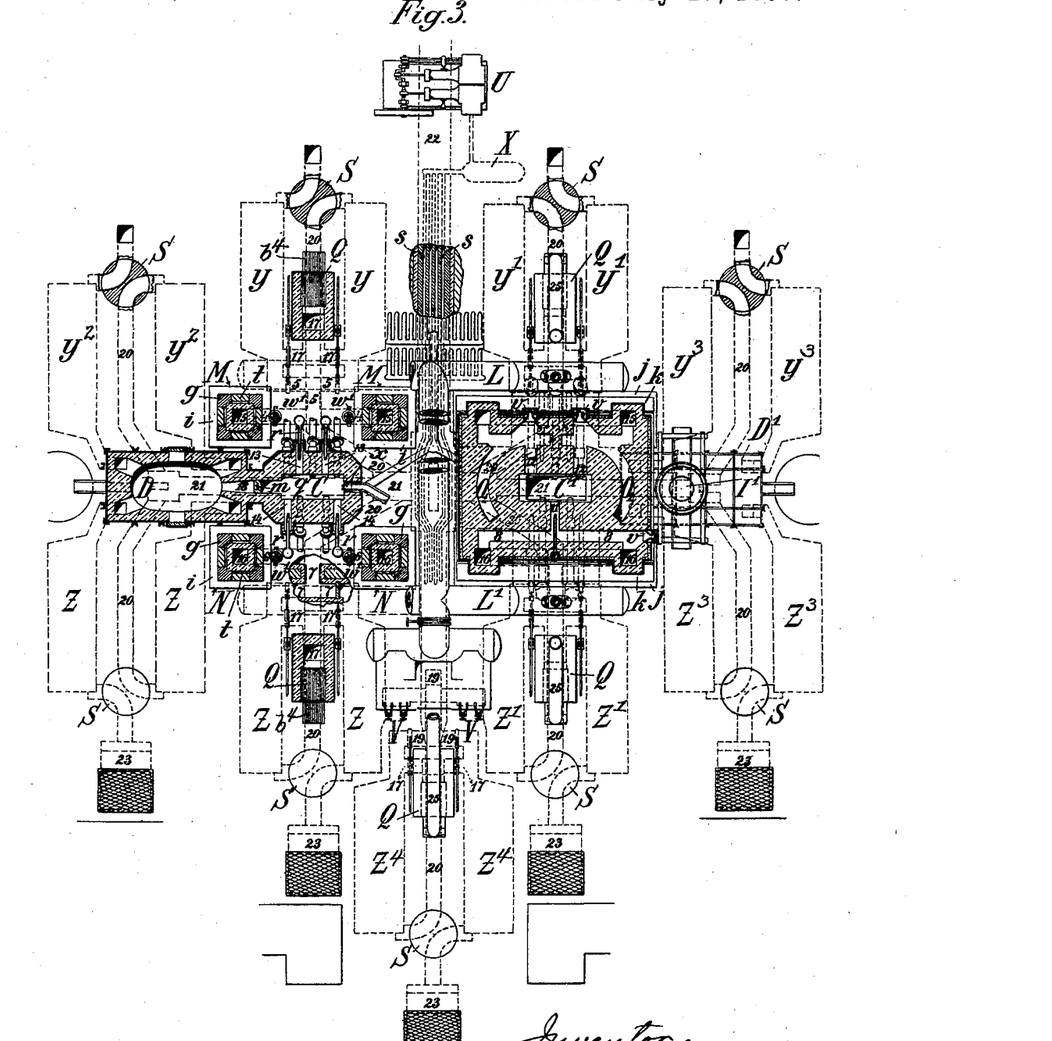
Fig. 3 shows a plan of the whole plant in which one of the blast-furnaces, together with the refining-chamber appertaining thereto, is represented in horizontal section on the line II II of Fig. 1 and the other in section on the line III III of Fig. 1.
Figure 4:
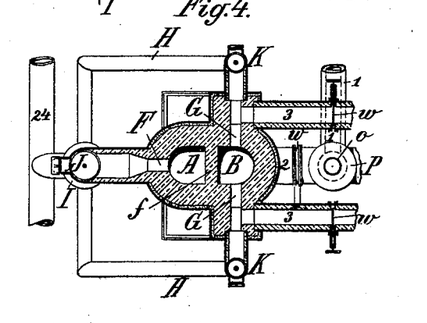
Fig. 4 is a horizontal section through one of the blast-furnaces on the line IV IV of Fig. 2.
Figure 5:
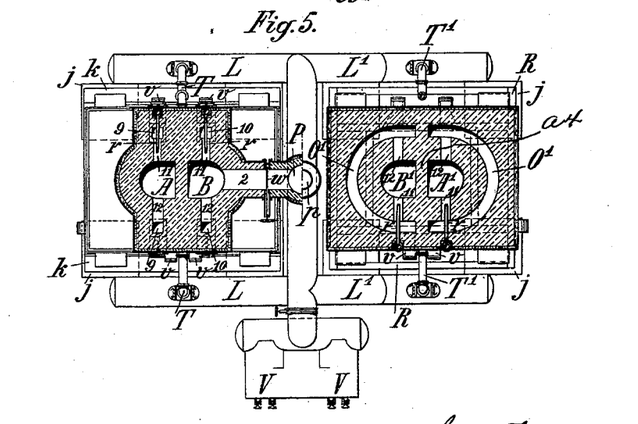
Fig. 5 is a horizontal section through one blast-furnace on the line V V and through the other on the line VI VI of Fig. 2.

As shown in Fig. 3, each blast-furnace or half of the smelting apparatus and each of the refining or Siemens-Martin furnaces D and D' are provided with two gas and two air regenerators, while the port 1 of gas-distributer P, Fig. 1, is connected with the mixture-gas generator, Figs. 7 to 12, through pipe $C^2$.

The gas-regenerators for the two blast-furnaces A B and A' B' are indicated by the symbols $y\ y$ and $y'\ y'$ and the air-regenerators by the symbols Z and Z', respectively, while the gas-regenerator for the refining-furnaces D and D' are indicated by the symbols $y^2\ y^2$ and $y^3\ y^3$ and their air-regenerators by the symbols $z^2\ z^2$ and $z^3\ z^3$, respectively, as shown in Fig. 3, the necessary air-blast being also provided, together with means for heating or regenerating the air forced into the apparatus, as hereinafter described, the regenerators for the air-blast being indicated in Fig. 3 by the symbols $Z^4\ Z^4$, respectively, all of which regenerators are worked with the furnace-gases.

To each of the gas and air regenerators the flame from a burner Q is conducted by the hereinbefore-mentioned conduits 17. The flame is caused to enter each of the two regenerators alternately by means of a slide $d^4$, made of refractory material. The regenerators instead of being furnished with ordinary reversing-valves made of iron are provided with cocks S, Fig. 3, made of refractory material, which are better able to withstand the action of the heat.

The regenerators $y\ y$ and $z\ z$ and $y'\ y'$ and $z'\ z'$ for the hearths C and C' are heated by the gaseous furnace products and those $y^2\ y^2$ and $z^2\ z^2$ and $y^3\ y^3$ and $z^3\ z^3$ of the refining-chambers D D' by means of the flame and hot gases escaping from said chambers. They are in communication with injectors or fans by conduits 19, Fig. 3, and with flues 21 and with the main outlet-conduit 22 by conduits 20. The conduits 21 serve for heating the bottom of the hearth by the used-up gases of combustion, whereas in the outlet-conduit are inserted pipes $s$, which serve for heating the compressed air. The air is conducted to the regenerators through slag-pits 23 and is thereby preparatorily heated.

Each hearth C C' is furnished with five holes and twyers $q$, through which air can be blown in from the air-conduit pipes L L'. These air-conduit pipes are also in communication with pipes T T', Fig. 2, to enable air to be blown also into the passages 11, which is effected by means of special twyer-pipes $r$, made of graphite.

It is of the greatest importance for producing the best results, and at the same time to enable the operation of the regenerative blast-furnace hereinbefore described to be most economically effected, that the quality of the generator-gas be such as to produce the high temperature necessary. For this purpose generator-gas is employed which consists of a mixture of ordinary generator-gas and water-gas, hereinafter designated "mixture gas."

In view of the fact that a gas-generator of any appropriate construction may be employed whereby a mixture of generator and water gas can be obtained, and in view of the further fact that such admixture of generator and water gas may be effected in any desired manner, and as these features are not claimed, I have deemed it unnecessary to illustrate and describe the same.

Each air-regenerator, which is employed for the purpose of obviating the use of the costly blast heating-stoves, is similar to an ordinary Siemens regenerator, but is provided with special air-inlets in order to prevent destruction or injury produced through the blowing in of air by means of ordinary blast-engines. The suction of the air in this case takes place out of special regenerators by means of injectors V, Fig. 3, made of aluminium-bronze, The injectors are worked by means of compressed air. The air compressed by a compressor U, Fig. 3, passes into a regulator X and thence through the tubes s to the injectors. The atmospheric air heated in the regenerators is in consequence of this sucked in and ascends through the conduit 19, Fig. 3. The air passes through openings in the injectors, mixes there with the compressed air, and is in consequence of the expansion of the latter on passing through the nozzles of the injectors compressed in such a manner that it enters the blast-conduit with sufficient pressure and at a temperature of 500° to 600° centigrade, to which the air must be brought for the purpose of smelting. The force necessary for transferring the air from the regenerators into the furnace and for overcoming the resistance in the latter is quite as great as in the case of the application of blast-engines and stone blast-heating apparatus. The cooling of the compressed air in the injectors is completely compensated for by the heating of the same in the tubes s, which are placed for this purpose in the flue.

The suction and blowing in of the air heated in the regenerators can be also produced by means of fans, which, according to the temperature to be produced, are constructed of cast-iron for temperatures up to 400° centigrade or of aluminium-bronze for temperatures up to 700° centigrade. Through the compressed air of the blast-conduit is effected, quite independently of the operation just described of the blowing in of heated air, the blowing in of the air out of the air-chambers of the regenerators of each half of the furnace. The regulation of the drawn-in quantity of air is effected in this case by means of the slides $w$ and $w'$, Fig. 2. The atmospheric air preparatorily to entering the regenerators is heated by the heat of the hot slag and pieces of cast-iron, which are put for this purpose into the slag-pits 23, which are situate before each of the cocks S. In this manner the introduction of air sufficiently heated is rendered possible without the use of stone blast-heaters and blast-engines, which, however, may remain in employment if they are already provided in a plant, in which case a pair of regenerators becomes unnecessary and can be dispensed with.

The process of working the furnace is as follows: The furnace is first fed with coal and heated both internally and externally, communication between the furnace and all the twyers and blast-conduits being shut off in order to dry the furnace. During this time the covers or valves $n$ of the gas-distributers J J' and the valves of the gas-conduit pipes 3 and of the regulator P, through which the two halves of the furnace are in communication with each other, are opened, and the gaseous products are free to pass through the burner Q to the regenerators. The flame passes through the conduits 21, situate under the bottom of the furnace, dries the furnace, and issues ultimately by the flues 22. In this manner a uniform and quick drying is possible, the progress of which can be observed through sight-holes in the shafts and the refining-chambers and the completion of which can be ascertained from the humidity of the products of combustion.

After the drying follows the heating up of the furnace. At the time of the delivery of the charge (ores mixed with fluxes) it is next to be observed, according to the size of the furnace and the numbers of layers, when the charge approaches the twyers. If there remains below the twyers still room for about twenty more charges, then a weak blast is blown into both halves of the furnace. If the descent of the charges is uniform in the two halves of the furnace, then this shows that the same conditions exist in the two halves of the furnace. If, on the contrary, there is an ununiform descent, then the operation is regulated by blowing more blast into the corresponding half of the furnace.

As soon as the smelting process has commenced—i. e., as soon as cast-iron appears in the hearth—the connection between the hearths C C' and the refining-chambers D D' is broken by lowering the slides $m$ without, however, interrupting the heating of the refining-chambers. When a sufficient quantity of liquid pig-iron has collected, it is allowed to flow out through the opening $y$, beneath the slag-hole $x$, for the first test, by which it is ascertained whether the smelting of the cast-iron is being conducted in the two halves of the furnace in the same and in a correct manner. If this is the case, the cast-iron is now, by raising the slides $m$, allowed to flow from the hearths into the refining-chambers in order to be therein fined or refined. The covers or valves $n$ of the two gas-distributers J J' are then alternately closed for equal periods—i. e., the one remains open, and consequently the corresponding gas-distributer is in communication with the chimney, while the other is closed. On this periodical changing of the covers or valves $n$ is principally dependent the further operation of the furnace, the motion of the gases, and the quality of the smelted product. To particularize, air is blown through the twyers $q$ and also through all the injector-passages 13 14 into the half of the furnace in which the cover or valve $n$ is closed after the cast-iron has been allowed to run into the refining-chamber, whereas during this time in the other half of the furnace the blast is stopped and the cast-iron is retained in the hearth of this half of the furnace by the lowering of the slide $m$. Instead of the blast air and mixture gas from the generators now pass into the latter half of the furnace in order to increase the temperature therein as much as possible and to produce a vigorous action of them on the cast-iron and the reduction of the ore. This is effected by the help of the gases flowing in from the first half of the furnace, which have access at three different levels by means of the open valves $w$ of the regulator P and of the gas-conduit 3 between the two halves of the furnace. At this time the fireproof valves $z$ of the conduits 9 and 10 must remain closed, as otherwise the gases would flow from the gas-jacket O through these conduits into the upper part of the shaft and thence direct to the outlet F or F' without having been used up for the smelting-column, whereas when the valves $z$ are closed the gases spread through the entire smelting-column and effect the reduction of the layers of ore.

The mode of operation of the furnace characterized by this different motion of the gases in the two halves of the furnace, one of these being worked with blast, operates further as follows:

I. In the refining-chamber D of the first half of the furnace, which is shut off by the closed slide $m$, the refining of the molten pig-iron previously run into it is proceeded with in the usual manner by the introduction of gas and air, while into the hearth C of the same half of the furnace blast is blown by the twyers $q$ and the injection-conduits 13 and 14. Out of the latter the heated gases and air from the regenerators are forced by the blast into the upper part of the hearth, while the gaseous products which issue from the shaft through the outlet-passages 12 mix in the gas-jacket O with the generator-gas, which reaches the gas-jacket by the pillars M, and are blown at the top on one side into the furnace, while on the opposite side the gaseous products issue through the outlet-passages 12 downward and are blown into the shaft mixed with the regenerator-gas. The preparatorily-heated air led into the air-conduit 8 is blown in under the partition-wall $f$ of this shaft by the same blast. The blowing in of gas and air is not allowed to take place in the shaft at the same level, in order to prevent a premature smelting of the ore and to produce a reduction-zone of greater height. In this manner there are created, so to speak, two "burning-points" in the shaft, (one in the upper part and one in the lower part,) which are situate opposite the injection-passages 11 and 14 and produce a high temperature. Between these two points the following takes place:

First, the reduction of the ores. This is produced by the heating of the shaft from inside at the expense of the heat of the gases that pass through the gas-jacket O and of the heat of the air heated in the regenerator, which is conveyed by the pillars N into the air-passages 8. In order to heat the shaft from the inside yet more powerfully, burners for burning fuel of inferior quality may be arranged instead of the manholes V, (shown in the drawings, Fig. 1,) so that if air of a certain pressure is uninterruptedly blown in through the air-conduit a constant flame is produced by the burners.

Second, the enrichment of the products of combustion through the presence of glowing coal and in-blown blast, the same being decomposed, and fresh heat-producing gases thus formed.

Third, the recombination of the gases and the using up of their heat in consequence of the constant circulation of the gases from the upper to the lower part, and vice versa, until they are expelled by the gases formed in the shaft and those coming from the regenerators.

Fourth, a novel motion of the gases, since when the cover or valve of the gas-distributer of one of the halves of the furnace is closed gases formed by the in-blown blast in the first shaft descend under the partition-wall, travel upward in the other shaft, and so participate in the reactions named under first, second, and third, whereby they pass through the entire smelting-layers in different directions and effect the complete reduction of the ores. The consequence of this is that charges can be more frequently introduced, and therefore the rate of production of the furnace is increased although the furnace is of comparatively small dimensions and a small quantity of fuel is employed.

In ordinary furnaces the conversion of the carbonic acid formed above the twyers $q$ into carbonic oxid necessary for the reduction in the presence of coal made incandescent by the blast takes place only once, because on the further quick upward motion of the gases through the charge the carbonic oxid is mixed with carbonic acid and neutralized—i. e., is without effect on the reduction—which is proved by the presence of carbonic oxid in the gaseous products, whereas in this furnace arrangement the gases are retained a longer time in the furnace and are in constant motion therein. In consequence of this there are constantly formed by the action of the in-blown blast on the glowing coal carbonic oxid from the carbonic acid and carbonic oxid and hydrogen from the steam. The decomposition of the products of combustion takes place several times and in different layers, while the coal is simultaneously changed into carbonic oxid, which change is advantageous for the reduction of the ores. Consequently the reduction-zone is situated in that part of the furnace which is located between the two aforesaid burning-points. The heat-producing gases which are formed by the repeated decomposition of the products of combustion in the presence of the coal rendered incandescent by the blast are constantly produced with a small consumption of introduced air, and contain consequently very little nitrogen. As the oxygen taken from these products of combustion is not mixed with any nitrogen much fuel is saved, whereas in the ordinary blast-furnace process much heat is taken up by nitrogen and other inert gases.

As the carbonic oxid serves principally for raising the temperature of the reduced cast-iron to the white heat (1,300° centigrade) necessary for the production of wrought-iron for each volume of the burned carbonic oxid ten volumes of the gas must remain unburned. This is made possible by the furnace arrangement hereinbefore described, in which the following operations take place:

First, the products of combustion are uninterruptedly regenerated at the expense of the carbon of the fuel rendered glowing by blast; second, a fresh quantity of heat-producing gas is introduced from the exterior, which gas is formed in the generator and contains hydrogen, which serves for the reduction of the ores and for freeing the ores from sulfur; third, the temperature of the furnace is raised by the external heating of the shaft, so that the chemical reactions can take place more easily. The gases, which increase the heating power of the combustible matter in the shaft, pass into the furnace ($a$) through the regulator that connects the two halves of the furnace, ($b$) through the regenerators into the smelting-space, and ($c$) through the conduits of the pillars out of the same regenerators into the shaft. The gases may be blown in by a blast or set in motion by the draft of a chimney. In this manner in the half of the furnace that is worked by means of blast there is effected, first, the preparation of the ores and of the fuel by driving out the hygroscopic water and the products of distillation; second, the mixture of the furnace-gases with the generator-gases, which latter consist of a mixture of ordinary generator-gas with water-gas; third, the reduction of the ores; fourth, the regeneration of the products of combustion; fifth, the carbonization of the reduced iron; sixth, the formation of the gases out of the solid coal, and, seventh, the smelting of the cast-iron.

II. In the second half of the furnace, which is exposed to the suction of the chimney through its connection therewith, the more or less heated gases that pass over from the first half of the furnace through the regulator P give up their heat-flow in consequence of the draft out of the first shaft B', under the partition-wall $f$, into the second shaft A', reduce thereby the ores, and escape into the gas-outlets F' G'. At the same time very highly-heated gases and air are drawn into the hearth C' from the regenerators, which gases and air produce on burning a temperature of about 2,200° centigrade, which is rendered possible, first, by the peculiar nature of the gas produced in the generators, and, secondly, by the circumstance that all the other reactions take place in the first half of the furnace. In consequence of this high temperature no carbonization of the iron takes place as in the first half of the furnace, in which a considerable cooling occurs in consequence of the decomposition of the products of combustion; but the reduced iron sponge passes into the hearth and is dissolved there in the previously-smelted cast-iron, whereby a partial decarbonization of the cast-iron is produced, and the mass is converted into a thick fluid. As soon as this occurs the reversal of the working action of the furnace must be effected by reversing the covers or valves $n$ in the gas-distributers J J', and the smelting of the cast-iron and of the ores is then proceeded with in the second half of the furnace in the manner hereinbefore described with reference to the other half. By this means the metal becomes carbonized, and consequently fluid, and a steel-like mass is obtained which is allowed to flow into the refining-chamber D' (together with the slag) for the purpose of being refined. During this time in certain cases scrap-iron of different kinds can be added to the refining-chamber D', after being preparatorily heated. The refining-chamber is then shut off from the hearth by again lowering the slide $m$ and the entire contents of the refining-chamber refined at a high temperature produced by the burning of the mixture gas. By the introduction of suitable alloys the desired nature is given to the metal. In the hearth of the same half of the furnace after the reversal of the covers or valves the smelting of the cast-iron is proceeded with in the same manner until the reversed operation is caused to commence in the other half of the furnace by reversal, and so on.

In case the cast-iron is to be smelted in both halves of the furnace simultaneously the connection between the hearths and the refining-chambers is broken and heated blast is blown into the twyers of both halves of the furnace. At the same time the refining of the products obtained can be proceeded with in the refining-chambers and the heat therein generated be used for heating the furnace-hearths at the bottom and at the slides $m$. Such a working of the furnace is useful if, notwithstanding the careful execution of the operations, the fluid metal should become viscous and form bears and crusts, which occurrence may be caused, for example, by the cooling of the regenerators and the consequent cooling of the hearths. In this case the covers or valves of the gas-distributers J J' and K K' are opened and blast is blown in through all the twyers, whereby the metal is again made liquid. The gases and air thus blown in are not lost, but still further promote the smelting.

The gaseous products in excess are employed for the heating of all the auxiliary apparatus, while the bears and crusts are dissolved by the ample production of slag and cast-iron; also, the freezing of the furnace need not be feared.

The hereinbefore-described regenerative blast-furnace may be constructed of such a size as to be suitable for smelting other ores, the layers of ore and fluxes being then selected so that any iron contained in the ore goes into the slag. In one half of the furnace the raw ore is smelted, while in the other half of the furnace the pure metal is obtained from the products of the smelting in the first half. By the alternately or simultaneously conducted reduction and oxidation of the products of the smelting operation the sulfur and the iron are removed from the same, whereupon the metal is freed from oxids by stirring in the refining-chambers, which are shut off from the hearth.

This furnace offers, therefore, the following advantages:

First. The working can be carried on in the two halves of the furnace as desired by means of the gas-distributing apparatus by reversing the flow of the gas, and thus the reduction and oxidation processes can proceed in the two halves of the furnace according to requirement either simultaneously or alternately.

Second. The gases enriched in the shafts can be mixed with the semiwater-gas or mixture gas heated in the regenerators and be uninterruptedly employed for the metallurgical processes.

Third. The quantity of fuel used in the interior of the furnace is reduced by the uninterrupted external heating of the furnace-shafts and at the same time the reactions are accelerated.

Fourth. The furnace can be more frequently charged—i. e., a large production can be obtained with apparatus of comparatively small dimensions.

Fifth. The heat of the hot slag and of the cast metal is supplied to the furnace when it commences to cool.

Sixth. By the motion of the gases in the furnace in different directions their heat is completely utilized, and as they are blown in by means of the blast and the oxygen of the products of combustion is used up smaller quantities of blast and fuel are necessary, and by the formation of the necessary quantity of carbonic oxid the iron is protected from the action of the carbonic acid.

Seventh. By the drawing in of the gases and air a high temperature, which prevents carbonizing, is produced in the half of the furnace which is connected with the chimney and in which the refining is taking place.

Eighth. The blowing of hot blast of adequate pressure into the furnace can be effected in a simple and economical manner.

Ninth. The production of wrought-iron is possible without any loss of heat, since the smelted pig-iron is run direct from the furnace-hearths into the refining-chambers.

Tenth. The two halves of the furnace can be worked independently of each other, and one half can, when required, be put entirely out of action.

Eleventh. Smelting products of various kinds can be produced—e. g., by working iron ores cast-iron, wrought-iron, or steel can be produced.

Metal of good quality is produced by means of this furnace, an economy of gaseous and solid fuel being obtained, which may be further increased if the heat which is lost by the cooling of the hearth is made useful, which may be effected by lining the walls and bottom of the hearth with carbonaceous bricks or with magnesite. This lining with magnesite may also be provided in the refining-chamber, in which case the same is inlaid with a basic addition for the purpose of dephosphorizing the ores, as an isolated layer between Dinas brick and dolomite.

I claim—

1. A smelting-furnace, comprising twin blast-furnaces, valved gas-ducts connecting said furnaces at different levels, means for supplying a combustible gas to said furnaces, and appliances constructed, arranged and operating so that one of the blast-furnaces can be operated as a reducing-furnace, and the other as a decarbonizing-furnace, and the furnace-gases utilized in such operations, for the purpose set forth.

2. A smelting-furnace, comprising twin furnaces, valved gas-ducts connecting the same at different levels, means for supplying a combustible gas to one or both furnaces, hot-air-blast appliances provided with connections between one or both furnaces, and appliances constructed, arranged and operated so that both said furnaces can be operated as reducing-furnaces, or one as a reducing-furnace and the other as a decarbonizing-furnace and the furnace-gases utilized in said operations, for the purpose set forth.

3. A smelting-furnace, comprising twin furnaces, valved gas-ducts connecting the same at different levels, means for supplying a combustible gas to one or both furnaces, hot-air-blast appliances provided with connections between one or both furnaces, and appliances constructed, arranged and operating so that both said furnaces can be uninterruptedly operated as reducing-furnaces, or one as a reducing-furnace and the other as a decarbonizing-furnace and the furnace-gases utilized in said operations, for the purpose set forth.

4. A smelting-furnace comprising twin blast-furnaces, valved gas-ducts connecting said furnaces at different levels, a source of supply of combustible gas, valved ducts connecting said source with the furnaces, air and gas regenerators for each furnace, means for heating said regenerators by the furnace-gases, and appliances constructed, arranged and operating so that one of said furnaces can be used as a reducing-furnace and the other as a decarbonizing-furnace, for the purpose set forth.

5. A smelting-furnace comprising twin blast-furnaces, means for dividing the charges therein into several parts, valved gas-ducts connecting corresponding divisions of the furnaces at different levels, means for supplying a combustible gas to both, and appliances constructed, arranged and operating so that one of said furnaces can be operated as a reducing-furnace and the other as a decarbonizing-furnace and furnace-gases utilized in said operations, for the purpose set forth.

6. A smelting-furnace comprising twin blast-furnaces, valved conduits connecting the same at different levels, a source of supply of a mixture of generator-gas and water-gas, means for introducing such gas into both blast-furnaces, appliances for cutting off the supply of such gas from one or the other furnace, an air-blast apparatus, suitable twyers at different levels of the blast-furnaces connected with such blast apparatus, means for heating the air to a high temperature before it reaches such twyers, cut-off devices for cutting off the supply of air from one or the other apparatus and air and gas regenerators for and connected with said blast-furnaces, in combination with a refining-furnace for each of said blast-furnaces, valved passages connecting said refining-furnaces directly with the blast-furnaces, appliances for operating the refining-furnaces with the blast-furnace gases, and suitable valved passages whereby the blast-furnace gases may be cut off from one or the other refining-furnace, for the purpose set forth.

7. A blast-furnace provided with a shaft divided at its upper portion into separate compartments by a depending partition, air-supply twyers at the base or smelting-zone of the shaft, a chamber exterior of the shaft and communicating therewith by open passages and blast-pipes delivering into the shaft through some of said passages, said exterior chamber being further provided with valves for dividing it into an upper and lower portion, substantially as described.

8. A blast-furnace provided with a gas-jacket, vertical valved flues leading therefrom, and passages leading from said jacket and flues into the furnace, in combination with hollow columnar supports connected at one end with the interior of the blast-furnace and at the other with the gas-jacket, for the purposes set forth.

9. A blast-furnace provided with a gas-jacket, vertical valved flues leading therefrom, and passages leading from said jacket and flues into the furnace, in combination with columnar supports for the furnace, communicating at one end with its interior and at the other with the gas-jacket, and air-injectors extending through said jacket and vertical flues into the gas-passages leading therefrom into the furnace, for the purpose set forth.

10. The combination of two blast-furnaces, each provided with a depending partition within its shaft dividing the shaft at its upper portion into separate compartments, pipes connecting one compartment of one furnace with a corresponding compartment of the other, and the remaining compartment of each furnace being provided with a gas-exit pipe having a suitable controlling-valve; whereby on closing one of the gas-exit-pipe valves and opening the other the gases from the one furnace will be directed into the other and will pass through the separated compartments, substantially as described.

11. The combination of two blast-furnaces each provided with a depending partition dividing the shaft at its upper portion into separate compartments, a pipe connecting one compartment of one furnace at its upper portion with a corresponding compartment of the other, and additional connections between the said two compartments at a lower level, said additional pipe connection being provided with a safety-valve; substantially as described.

12. The combination with two blast-furnaces divided vertically into two charge-chambers for a portion of their length from the top downward, valved pipes connecting the charge-chambers of the two furnaces in pairs near their upper end, and similar connections at a lower level; of a dust-collector interposed in the last-named connections, and a gas-generator connected with said dust-collector, substantially as and for the purpose set forth.

13. In a blast-furnace, the combination with the main blast-pipes L and L', the main discharge-flue 22 for and located below the furnace, an air-compressor and a series of pipes located in said flue and receiving air from the compressor; of an injector receiving air from said pipes, an air-regenerator having its outlet connected with the injector-casing, and means for heating the regenerator by blast-furnace gases, for the purpose set forth.

In testimony whereof I affix my signature in presence of two witnesses.

WLADIMIR FEDOROWITSCH BERNER.

Witnesses:
M. DIXON,
E. KÜRZ.